United States Patent
Dreyer et al.

(10) Patent No.: US 10,170,107 B1
(45) Date of Patent: Jan. 1, 2019

(54) EXTENDABLE LABEL RECOGNITION OF LINGUISTIC INPUT

(71) Applicant: Amazon Technologies, Inc., Seattle, WA (US)

(72) Inventors: Markus Dreyer, Seattle, WA (US); Pavankumar Reddy Muddireddy, Urbana, IL (US); Anjishnu Kumar, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/394,167

(22) Filed: Dec. 29, 2016

(51) Int. Cl.
*G10L 15/18* (2013.01)
*G10L 15/16* (2006.01)
*G10L 15/06* (2013.01)
*G06N 3/02* (2006.01)

(52) U.S. Cl.
CPC ........ *G10L 15/1815* (2013.01); *G10L 15/063* (2013.01); *G10L 15/16* (2013.01); *G06N 3/02* (2013.01); *G10L 2015/0635* (2013.01)

(58) Field of Classification Search
USPC .................................................. 704/232, 257
See application file for complete search history.

(56) References Cited

U.S. PATENT DOCUMENTS

| 2011/0307252 | A1* | 12/2011 | Ju ........................ G10L 15/1822 704/232 |
| 2015/0066469 | A1* | 3/2015 | Maturana ............ G06F 17/5022 703/19 |
| 2015/0310862 | A1* | 10/2015 | Dauphin ............. G10L 15/1815 704/257 |
| 2017/0169314 | A1* | 6/2017 | Dijkman .............. G06K 9/4628 |

* cited by examiner

*Primary Examiner* — Abul Azad
(74) *Attorney, Agent, or Firm* — Occhiuti & Rohlicek LLP

(57) ABSTRACT

An approach to extending the recognizable labels of a label recognizer makes use of an encoding of linguistic inputs and label attributes into comparable vectors. The encodings may be determined with artificial neural networks (ANNs) that are jointly trained, and a comparison between the encoding of a sentence input and the encoding of an intent attribute vector may use a fixed function, which does not have to be trained. The encoding of label attributes can generalize permitting adding of a new label via corresponding attributes, thereby avoiding the need to immediately retrain a label recognizer with example inputs.

17 Claims, 5 Drawing Sheets

EXTENDABLE LABEL RECOGNITION OF LINGUISTIC INPUT

BACKGROUND

This invention relates to scalable label recognition of linguistic input, and more particularly to scalable intent recognition of speech utterance user input.

There are many applications of automated interpretation of linguistic input in which an input must be mapped to one of a known set of labels or categories. One form of classification makes use of a fixed-length numerical vector representation of the linguistic input, for example, with each position in the vector representing a particular word, word sequence, or class of words. A parameterized classifier, for instance an Artificial Neural Network (ANN) that is parameterized by numerical weights, is configured using examples of the vector inputs and corresponding correct labels. This configuration generally optimizes the numerical parameters in a procedure often referred to as "learning" or "training."

When a new label is to be introduced into the system, one approach is to augment the examples of the vector inputs and the corresponding correct labels with examples for the new label, and configuration procedure is repeated. However, such an approach is not possible without the additional examples, and may not be effective with only a limited number of examples. Therefore, there is a need to have a procedure that permits generalization of a configuration determined from an initial set of labels in order to introduce a new label with few if any training examples.

One application of a classification of a linguistic input is in a spoken understanding system in which a user may utter commands related to different application domains (referred to herein as "skills") or related to different action or commands within a domain (referred to herein as "intents"). Skill classification and/or intent classification are examples where the set of labels may need to be expanded after an initial configuration of a classifier without necessarily having a suitable training examples available to reconfigure the system.

DETAILED DESCRIPTION

A number of embodiments described below address natural language understanding of a user input, and more particularly a task of recognition of an intent of an input speech utterance in an automated manner using technologies including automated natural language processing and artificial neural network techniques. These embodiments may be parts of speech-controlled computer-based systems, which are described fully after a description of the intent-recognition components. Furthermore, as is discussed in more depth below, the approaches introduced for intent recognition of speech input are applicable to recognition or scoring of various types of labels, and applicable to other forms of input to be labeled including other forms of input, for instance text-based input as well as inputs that may not correspond to user input.

Figure 1:
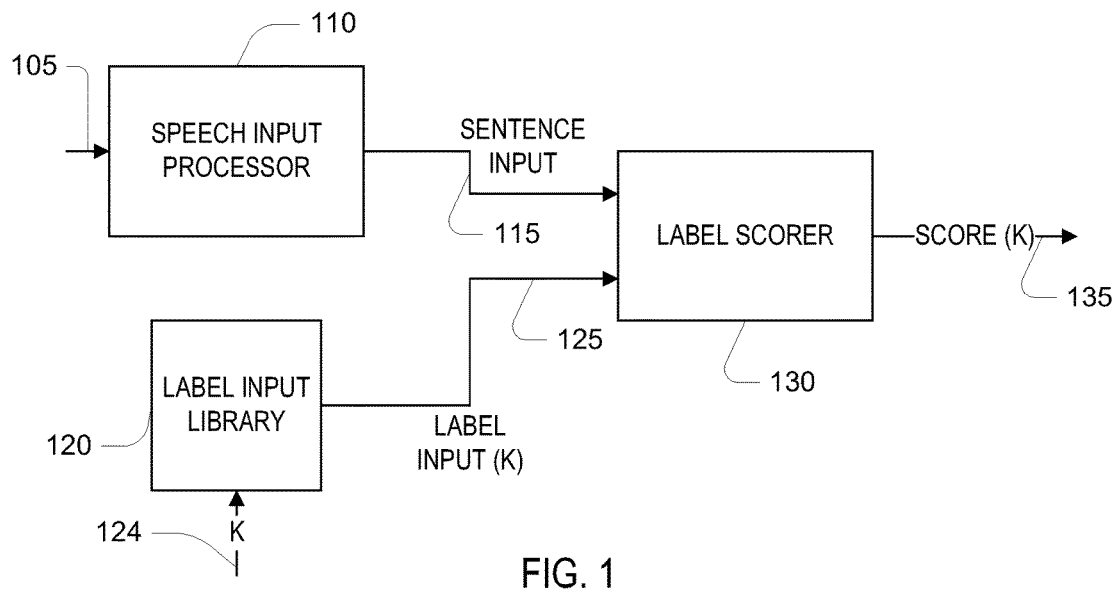
FIG. 1 is a block diagram for scoring a speech input according to a label.

Referring to FIG. 1, in one embodiment, a speech input processor 110 receives a speech input 105 (i.e., a user input), which is a data or signal representation of a user's spoken utterance, and outputs a sentence input 115, which is an automatically-computed transformation of the speech input. Very generally, the speech input processor 110 includes an automated speech recognizer, as well as a text processor for transforming word-based output from the speech recognizer into a fixed-length representation, for example, as a fixed length numerical vector. Various examples of the speech input processor 110 are described later in this document. For the most part, the nature of the further processing of the sentence input is not dependent on the nature of the speech input processor. In this embodiment, the output of the speech input processor 110 is a sentence input 115, which is a linguistic input for subsequent processing (i.e., it represents linguistic information in the speech input) that is represented as a fixed-length numerical vector that characterizes the words and phrases present in the speech input. The sentence input 115 may also represent context of the user's input, for example, based on previous inputs from the user. Each entry in the vector may be associated with presence of a different word, class of words, sequence of words (n-gram), etc. That is, different positions in the sentence input vector represent different characteristics or attributes of the input speech from which the intent may be inferred. Various alternative forms of sentence input are discussed later in this document.

The speech input may represent one of a number (N) of different labels. For the sake of exposition of this first embodiment, these labels correspond to a number of discrete "intents" of the speech input within a set of possible "skills". More generally, labels for speech inputs may represent a wide variety of categorizations of the that can be determined based on a linguistic processing of the input, for example, categorization by the semantic interpretation (e.g., meaning) of the input. In this description, "intent" should be understood broadly to include goals, tasks, sub-tasks, and the like associated with a result that the user intended to occur upon linguistic processing of the user's input by the system, and "skill" should be understood broadly to include grouping of related intents. An example of an intent is "call taxi" or "turn on music." These intents are predefined and represented in a label input library 120. In this library, each intent is represented as a fixed-length vector of numerical quantities, which may be real-valued, integer valued, or binary indicators (e.g., 0, 1 or −1, +1). The label input is referred to below as an "attribute vector" of the intent, and in general, the attribute vector of the $k^{th}$ intent is denoted a(k). In at least some embodiments, positional association of entries of the attribute vectors with attributes of intents is determined, for example, based on human selection of attributes that may be pertinent for distinguishing different intents. For example, a particular position in the attribute vector may indicate the skill involved or whether or a degree to which the intent is related to a skill category, for instance a transportation category of skills in one position, while another position may indicate a relationship to a messaging category. Other positions in the attribute vector may specify particular features within a skill. Other positions may be associated with particular words, word classes, phrases, word n-grams, and the like, that are associated with a representative sample of command inputs that are associated with the intent. Yet other positions may be associated with meta-data for the intent, for instance, a popularity of the intent.

A label scorer 130 accepts one sentence input 115 and one attribute vector 125, selected according to an input 124 to the label library, and produces a score 135. Very generally, one mode of operation for determining a label of a speech input is to compute the sentence input 115 once using the speech input processor 110, and then to iterate through all attribute vectors in a stored label input library 120, which includes attribute vectors a(1) through a(N). On the $K^{th}$ iteration, a selector input K 124 is used to provide a(K) 125 from the library as the label input to the label scorer 130, producing a corresponding score, denoted SCORE(K). Not shown in FIG. 1 is a controller that causes the iteration over the values K and retaining the value K for which the SCORE(K) is best (in this embodiment algebraically greatest). That retained value K for the greatest score is used as the inferred label of the speech input. More generally, the N-best scores and associated labels are retained and provided as output by the label scorer.

Figure 2:
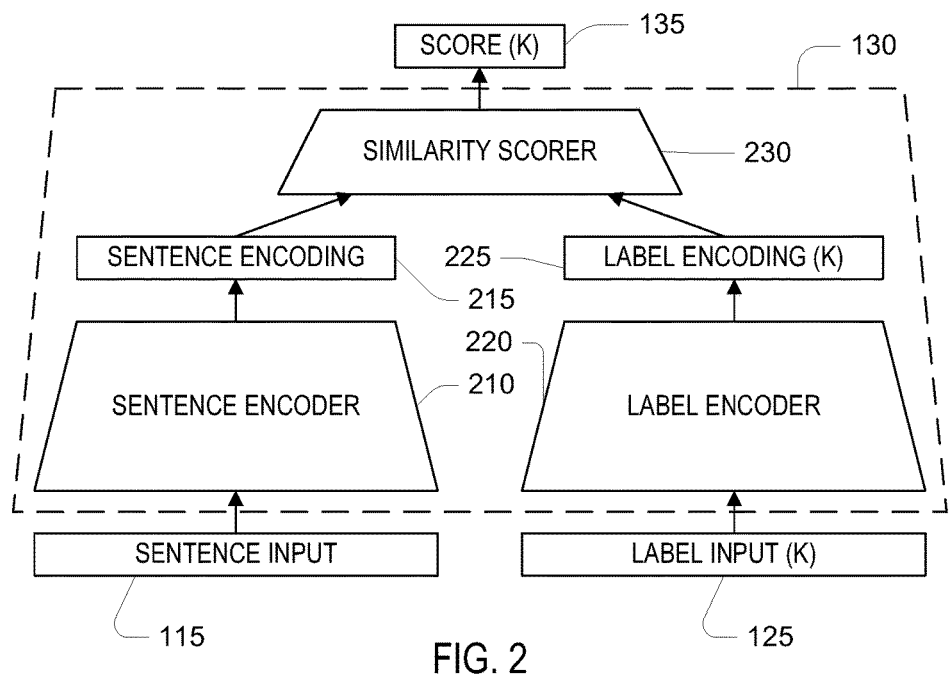
FIG. 2 is a block diagram of a label scorer of FIGS. 1.

Referring to FIG. 2, the label scorer of FIG. 1 has a particular structure that makes use of three encoders, which do not necessarily have the same internal structure. A sentence encoder 210 accepts the speech input vector 115, and produces a fixed length numerical vector referred to as the sentence encoding 215. In general, the dimension of the sentence encoding vector is substantially smaller than the dimension of the speech input vector 115—for example, the encoding vector may have 20 entries while the speech input vector may have 100, 1000, or more entries. The label input 125 is similarly processed by a label encoder 220 to produce a label encoding 225. In this embodiment, the label encoding is a numerical vector with the same number of entries as the sentence encoding vector 215.

A third encoder of the label scorer is a similarity scorer 230. The similarity scorer 230 accepts the sentence encoding vector 215 and the label encoding vector 225, and produces a numerical score 135. In general, the score represents a degree of similarity of the two input encoding vectors 215, 225; in this embodiment, the greater the similarity, the algebraically greater the score 135.

In general, the sentence encoder 210 and the label encoder 220 are each configured by a set of parameter values, which in certain examples may be referred to as "weights." The similarity scorer may be, but is not necessarily, configured by a set of parameter values. Collectively, the parameter values of the encoders of the label scorer 130 are referred to as the parameter values of the label scorer 130. Generally, a system that makes use of the structure shown in FIG. 1 is configured with the label input library 120, and corresponding parameter values of the label scorer 130. Note that there is a correspondence between the parameter values and the attribute vectors of the label input library that results in the correct label having in general a greater output score than incorrect labels.

In the arrangement shown in FIG. 1, the label input library 120 may be augmented, for example, adding an $N+1^{st}$ attribute vector that is determined for a further label that is to be known by the system. To the extent that the label encoder 220 is able to generalize and map the new attribute vector to an appropriate encoding vector, the arrangement is able to recognize this new label when represented in the input speech. Aspects of the label encoder that enable such generalization are discussed further below.

Figure 3:
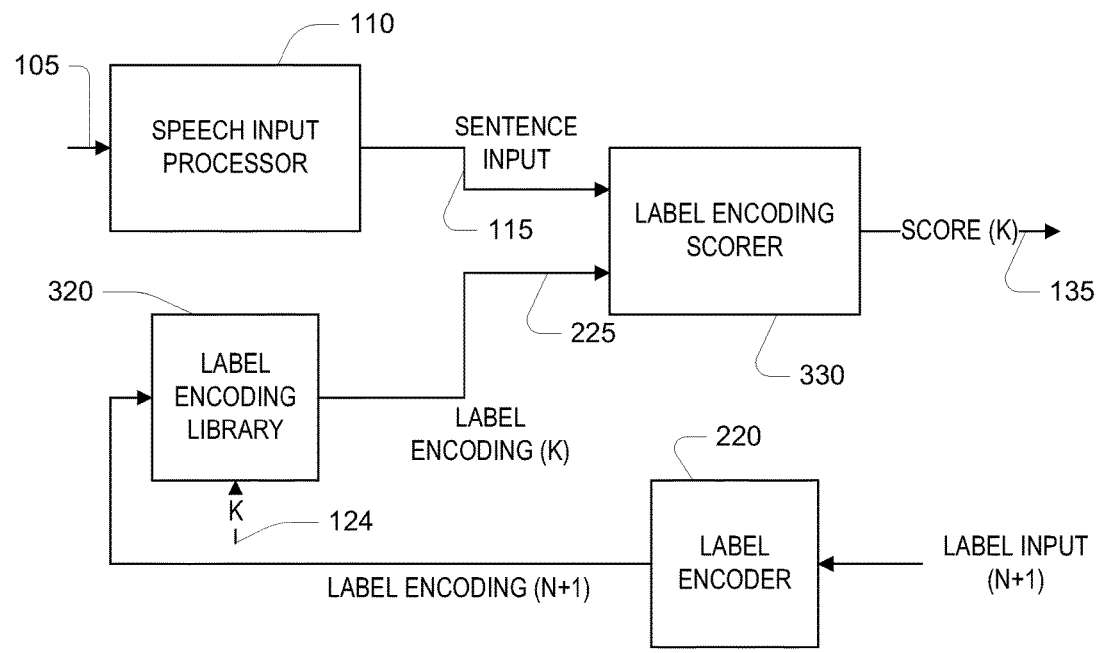
FIG. 3 is a block diagram for scoring a speech input according to a label of an extendable set.

Note that for each speech input, the label encoder 220 is used to process all the label inputs of the label input library 120 in order to determine which label yields the best score. Referring to FIG. 3, in an alternative embodiment, the label encoding vectors 225 that are output from the label encoder 220 are determined prior to processing the speech input and are stored in a label encoding library 320. The arrangement shown in FIG. 3 operates in an analogous manner as the arrangement of FIG. 1, but a label encoding score 330 receives the label encodings 225 rather than the label inputs 125 (i.e., attribute vectors) that are provided to the label score 130 of FIG. 1.

Because the label encoding library 320 has label encodings rather than the label inputs (attribute vector), in order to augment the system to handle an $N+1^{st}$ label, the label encoder 220 shown in FIG. 3 is used to compute the encoding for the new label from its attribute vector, and then this encoding is stored in the label encoding library 320.

As introduced above, the sentence encoder 210 and the label encoder 220 are parameterized. One form of encoder is a feed-forward artificial neural network (ANN), where the parameters correspond to weights in the neural network. Another form of encoder is a linear transformation in which the label input, represented as a column vector is multiplied on the left by a rectangular matrix to yield the label encoding, also represented as a column vector. The similarity scorer 230 is not necessarily parameterized, for example, being computed as the cosine between its input vectors, or alternatively computed as the inverse of a distance (e.g., a Euclidean distance, L1 distance, etc.) between its input vectors. Alternatively, the similarity scorer 230 is parameterized, for example, as an artificial neural network with weight parameters where an output of the neural network represents a match (e.g., a probability or likelihood) that the label encoding 225 matches the sentence input 115.

The parameters of the label scorer 130 are determined using a reference set of inputs. To more precisely describe the procedure for determining the parameters of the scorer, we define the following:

x a sentence input 115 to the label score; $x_i$ is the $i_{th}$ input of the reference set of inputs y a label; $y_i$ is the label of the $i^{th}$ input of the reference set a(y) an attribute vector for the label y; and a label input 125 for the label y to the label scorer θ the parameters of the scorer; parameters of the sentence encoder are denoted $\theta^{(u)}$ and parameters of the label encoder are denoted $\theta^{(w)}$ $\phi(x; \theta^{(u)})$ the sentence encoding 215 output from the sentence encoder with an input x configured with the parameters $\theta^{(u)}$ $\phi(y; \theta^{(w)})$ the label encoding 225 output from the label encoder with an input a(y) configured with the parameters $\theta^{(w)}$ W a matrix representation of the label encoder used in certain embodiments, such that $\phi(y; \theta^{(w)}) = Wa(y)$, where a(y) is treated as a column vector ρ(x, y; θ) the score output of the label scorer with an input (x, a(y)) and with parameters θ (referred to as SCORE 135 above)

ŷ a label that has the greatest score for a corresponding sentence input x; $\hat{y}_i$ is the label that maximizes $\rho(x, \hat{y}_i; \theta)$ y' a label not equal to the true label that has the greatest score for a corresponding sentence (i.e., the "second best" label); $y'_i$ is the label that maximizes $\rho(x_i, y'_i; \theta)$ for $y'_i \neq y_i$ As introduced above, the parameter determination procedure (i.e., determination of values of the parameters) uses a set of matched input/label pairs $(x_i, y_i)$. The sentence inputs $x_i$ may be computed by applying the speech input processor 110 to speech inputs (e.g., acoustic waveform inputs), or may be provided in text form (e.g., from a developer). The labels $y_i$ are determined manually based on human review of the speech inputs (e.g., by listening to them), or in some embodiments may be determined in an automated manner based on confirmation or inference during the collection of the speech inputs. In some examples, the inputs $(x_i, y_i)$ may be collected for the purpose of constructing a reference set, while in some examples the inputs are collected during use of a runtime system, and the labels $y_i$ are inferred based on the user's acceptance of the action of an automated system (e.g., determination of whether the user accepted the interpretation $y_i$ made by the system when they provided a speech input corresponding to $x_i$).

To reiterate an aspect introduced above, in this parameter determination procedure, there are N labels (i.e., N possible values of the labels $y_e$). However at least some implementations permit addition of an N+1$^{st}$ label (or multiple additional labels) without necessarily updating the parameter values. This aspect is discussed in more detail after a description of the parameter determination procedure.

A number of different criteria may be used to determine the parameter values. One criterion is based on selecting the parameters according to the "margin" in the score between the true label $y_i$ and the second best label $y'_i$. In one embodiment that makes use of such a margin, the margin for the $i^{th}$ reference input is defined as $$\zeta_i = \rho(x_i, y'_i; \theta) - \rho(x_i, y_i; \theta) + \gamma$$

where $\gamma$ is chosen, in general, to be a small positive quantity. The overall parameter determination procedure seeks to minimize the sum of the positive instances of this margin over the reference inputs. Note that if the margin is positive, this means that the second best label score is within $\gamma$ of the correct label score. Ideally, all the second best scores are at least $\gamma$ smaller than the scores of the true labels, and the sum is zero.

One aspect of the parameterization of the label scorer 130 is that for any particular sentence input and label input, the score is differentiable with respect to each parameter. One approach to determining the parameters makes use of incremental update (i.e., optimization) using essentially a variant of conventional neural network training procedures (e.g., back-propagation). In particular, a vector of partial derivatives of $\zeta_i$ (i.e., the gradient of $\zeta_i$ with respect to a vector of the parameters, computed at the current value of those parameters) is defined as follows $$\frac{\partial \zeta_i}{\partial \theta} = \left( \frac{\partial \rho(x_i, \hat{y}'_i)}{\partial \theta} - \frac{\partial \rho(x_i, y_i)}{\partial \theta} \right) \times [[\zeta_i > 0]]$$

where $[[\pi]]=1$ if $\pi$ is true, and 0 otherwise.

In one implementation, a parameter determination procedure loops through the reference inputs $(x_i, y_i)$ and performs the following steps:

1. Determine $y'_i$ based on the current parameter values $\theta$
2. Compute $$g = \frac{\partial \zeta_i}{\partial \theta},$$

the gradient (vector of partial derivatives) of the margin
3. Update $\theta \leftarrow \theta + \alpha g$, where $\alpha$ is an update rate, which may be adapted during the procedure to reduce the rate of change of the values of the parameters. Note that, in general, this step modifies parameter values both for the sentence encoder and the label encoder (and the similarity scorer if it is also parameterized).

It should be understood that there are other ways of optimizing the parameter values, for example, based on processing batches of reference inputs. Furthermore, for certain forms of encoders, alternative procedures may be used other than incremental optimization, for example, based on matrix computation procedures.

Figure 5:
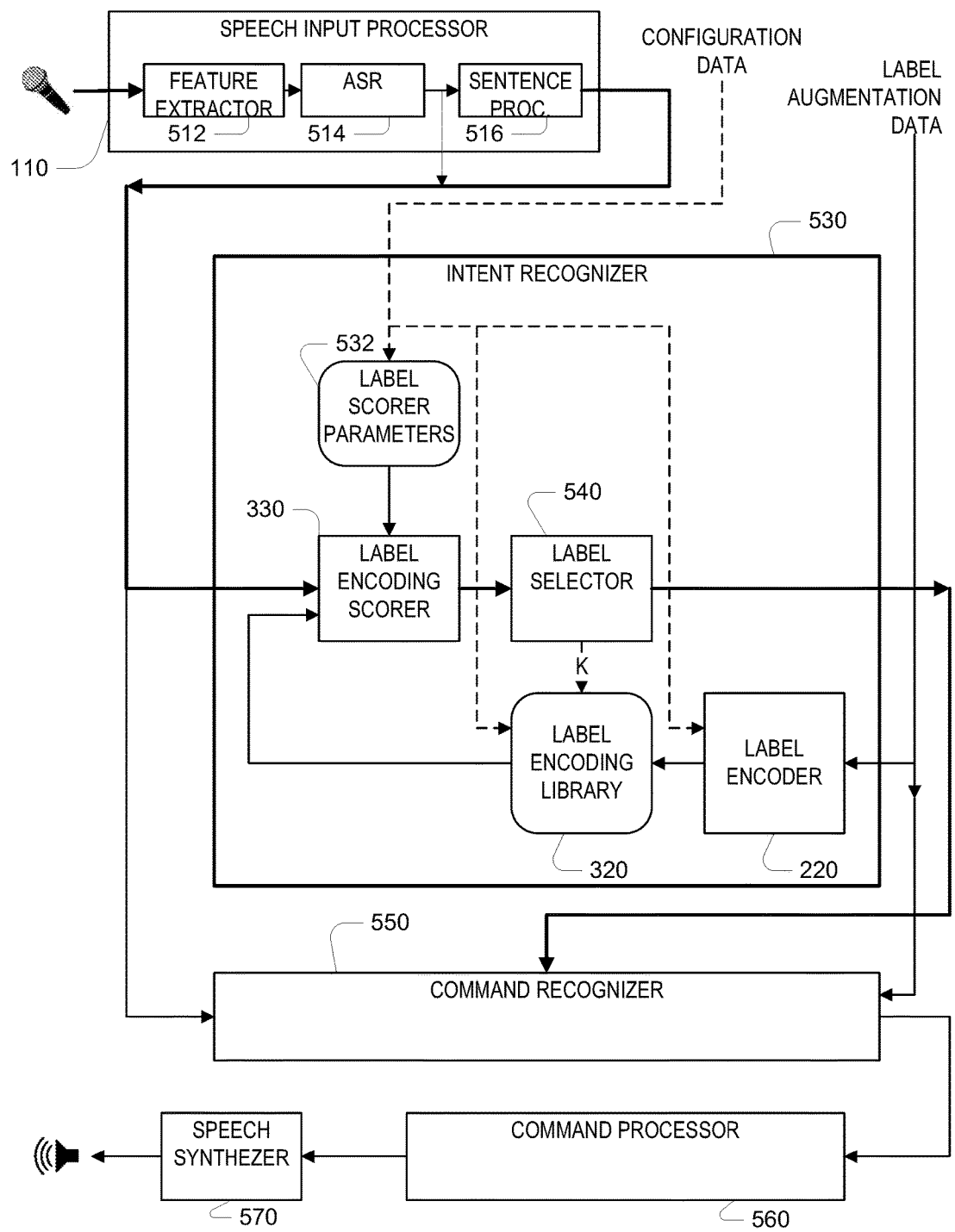
FIG. 5 is a block diagram of a system that incorporates the label encoding scorer of FIGS. 3-4.

Turning now to a description of how the techniques are used in a particular speech processing system, FIG. 5 provides a block diagrams of an example of such a system. As introduced above, a speech input processor 110 accepts speech input, for example, from a microphone as illustrated, or over a data link (e.g., a data network connection) from a remote device that includes a microphone, sensing an acoustic signal in an environment. In general, the speech input processor 110 includes a feature extractor 512, which processes an acoustic waveform and produces a feature representation of the waveform (e.g., frequency band spectra energies for a set of frequency bands, computed at a frame repetition rate, for example, every 10 ms.). An automatic speech recognizer 514 processes the features, and produces a text transcription of the input (or some other form, for example, a word lattice). The input speech processor also includes a sentence processor 516, which further processes the text transcription to produce a fixed-length representation of the input, which serves as the sentence input 115 for the label encoding scorer 330 of the intent recognizer.

Figure 4:
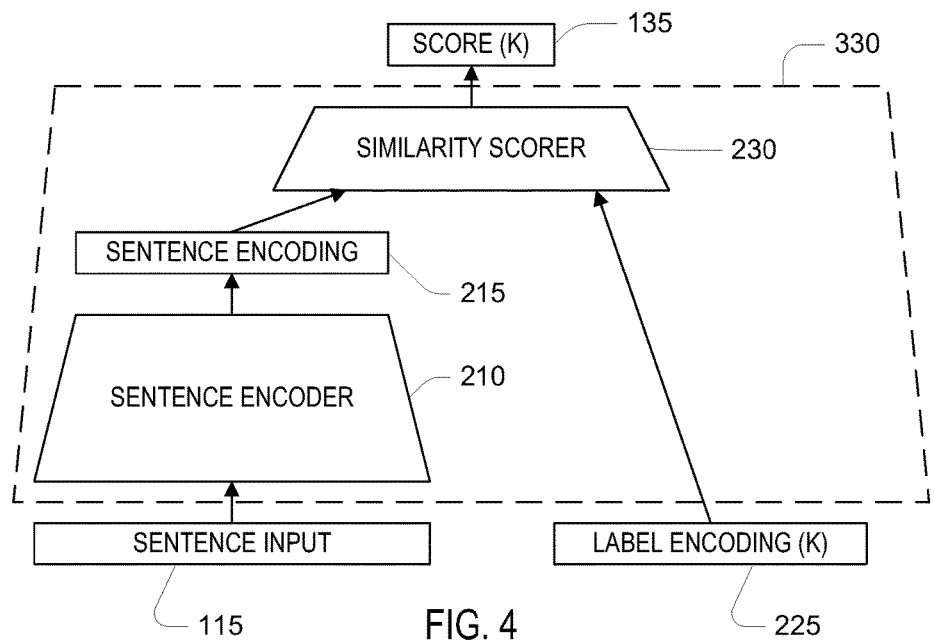
FIG. 4 is a block diagram of a label encoding scorer of FIG. 3.

The sentence input 115 from the speech input processor is passed to an intent recognizer 530, as well as to a command recognizer 550, in conjunction with the text transcription of the speech input. In this system, the intent recognizer 530 outputs a short list (e.g., an N-best list) of possible intents (and their associated skills) for further processing. By providing such a short list, the correct intent is likely in the list, thereby limiting the amount of further possibly more computationally intensive processing that needs to be applied to possible intents. The label encoding scorer 330 has the structure described with reference to FIG. 4. A label selector 540 receives the score output from the label encoding scorer 330, and controls the iteration over labels (K) causing the label encodings of the label encoding library 320 to be testing in turn to determine the N-best recognized intents of the speech input.

A command recognizer 550 receives both the text transcription from speech input processor 110, as well as the N-best recognized intents from the intent recognizer 530. The recognized intents cause the speech input to be processed according to those intents, for example, applying different types of processing for different recognized intents, for instance, applying skill-specific intent scorer according to the recognized intents. The command recognizer uses these inputs to determine the specific command that is present in the speech input, and passes the result of that recognition to a command processor 560, which acts on the command, including when appropriate, providing speech output via a speech synthesizer 570, which may implement an automated transformation of a text to an acoustic waveform in a process generally referred to as "text-to-speech" conversion, for example, based on concatenation of stored segments of speech corresponding to subword units of the text.

The intent recognizer 530 includes a configuration input for receiving the label scorer parameters 532, which are used to configure operation of the label encoding scorer 330 and the label encoder 220. The configuration data also includes the label encoding vectors for initially populating the label encoding library 320 with N vectors that match the parameters of the encoders.

The intent recognizer 530 also includes a label augmentation input for receiving label augmentation data to add to the list of intents known to the intent recognizer. The label augmentation data received on this input includes an attribute vector for a new intent (e.g., an $N+1^{st}$ intent), and as described above, this attribute vector is passed through the label encoder 220 to produce an addition label encoding, which is added to the label encoding library. The label augmentation data may come from a developer who has added a new intent to an existing skill. The label augmentation data also includes information passed to the command recognizer to configure that recognizer to process input that is recognized to have the augmented intent.

Note that a developer adding an intent to an existing skill, or even adding a new skill with a set of intents, is able to add the intents without necessarily providing data for training the intent recognizer. That is, this existing configuration of the intent recognizer may be sufficient to essentially bootstrap operation of the system supporting the new skill and/or intents, thereby providing a way to collect operational data including user inputs that are associated with the new skill and/or intents.

Although an existing configuration of the intent recognizer may be sufficient to operate the system supporting a new skill and/or intents, operational data is collected for that new skill and/or intents, and annotated to associate a true intent with each user input. Then, from time to time the parameter determination procedure is repeated suing the new data, thereby updating the parameters of the intent recognizer and the label encoder, and the label encoding library is updated based on the newly configured label encoded.

Although the above description focuses on recognition of intents, it should be recognized that the same procedure may be applied to different recognizers. For example, skills labels may be recognized using this approach rather than intents. Yet other linguistic categories (or other types of categories) of user input can be recognized with this approach, allowing addition of an $N+1^{st}$ category without retraining the recognizer.

Alternative implementations may use other criteria for determining the parameters of the intent recognizer. For example, rather than the margin loss function presented above, an entropy-based function may be used in which the output of the label scorer is a probability distribution over the possible labels.

Figure 6:
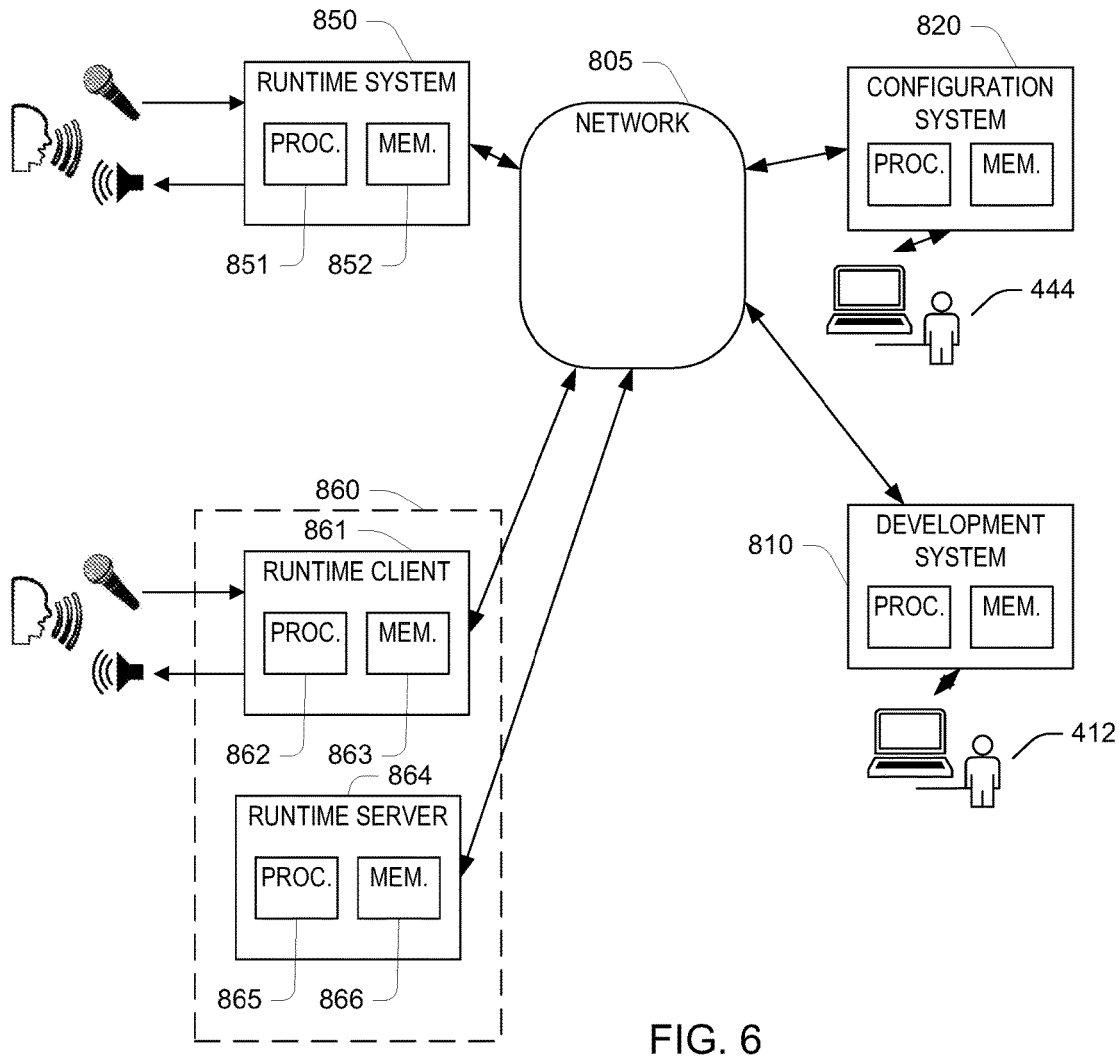
FIG. 6 is a system diagram.
Figure 7:
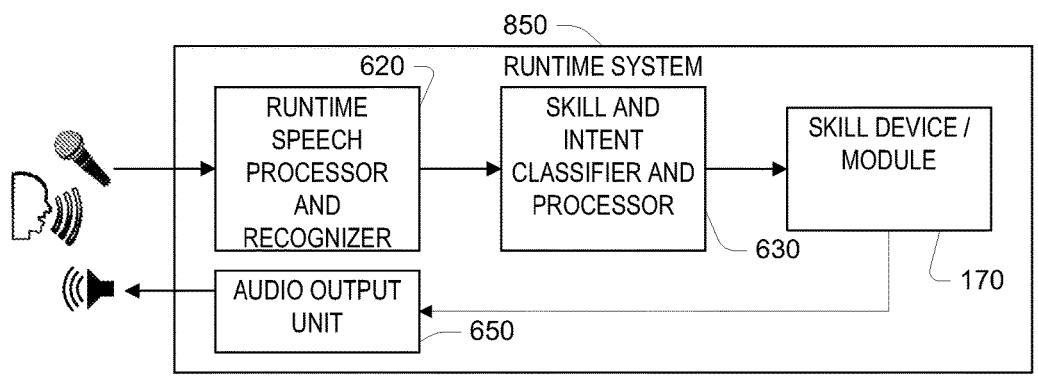
FIG. 7 is a block diagram of a runtime system.

Referring to FIG. 6, in some implementations, the system shown in FIG. 5 may be hosted on a runtime system 850. The runtime system accepts audio input from a user at a microphone, and optionally provides audio output to the user via a speaker. The runtime system may include a processor 851, for instance a general purpose processor or a digital signal processor (DSP), and a memory 852 (e.g., a non-transitory semiconductor memory readable by the processor). For example, the runtime system is an "appliance" that may be placed in the environment (e.g., on a shelf or table). In some examples, this device monitors its environment, and acts on user input, such as spoken commands, that is sensed in the environment. The runtime input processing procedures described above may be implemented in software that includes instructions for causing the processor 851 to perform the steps of the described procedures. The memory 852 also holds configuration data for the system, for example, including the values of weights used to configure the intent classifiers for one or more skills, and in software-based implementations software instructions for performing the numerical computations implementing the intent classifiers 140. The runtime system 850 may be coupled to a network 805 (e.g., a local area network and/or the public Internet). A development system 810, which is used by the developer 412, may be used by a developer 412 to introduce new intents and/or skills that are used by a configuration system 820 to determine the configuration data for the intent recognizer that is hosted in the runtime system 850. In some implementations, the functions hosted by the runtime system 850 may be distributed in a distributed runtime system 860, which may have a runtime client 861, with a processor 862 and memory 863, and also a runtime server 864, which interacts with the runtime client 861 at runtime. For example, the runtime client 861 may implement data acquisition (e.g., signal processing and speech activity detection or detection of a wakeword) and feature extraction, and send the result to the runtime server 864 over the network 805, where speech recognition and skill and intent recognition based on the received data is performed. Referring to FIG. 7, the runtime system 850 of FIG. 6 (as well as the combined computers of the distributed runtime system 860) implement a logical processing in which the audio data produced from the acquired audio signal received at the microphone is passed to a speech processor and recognizer to produce, for example, a word sequence that is passed to a skill and intent classifier and processor, which implements the intent recognizer. The output of the skill and intent classifier and processor 630 is passed to the skill device and/or module 170, which causes the commanded intent from the user to be acted upon. In some cases, the skill device and/or module causes an audio output to be passed to the user via an audio output unit, which implements, for example, an automatic speech synthesis procedure.

Figure 8:
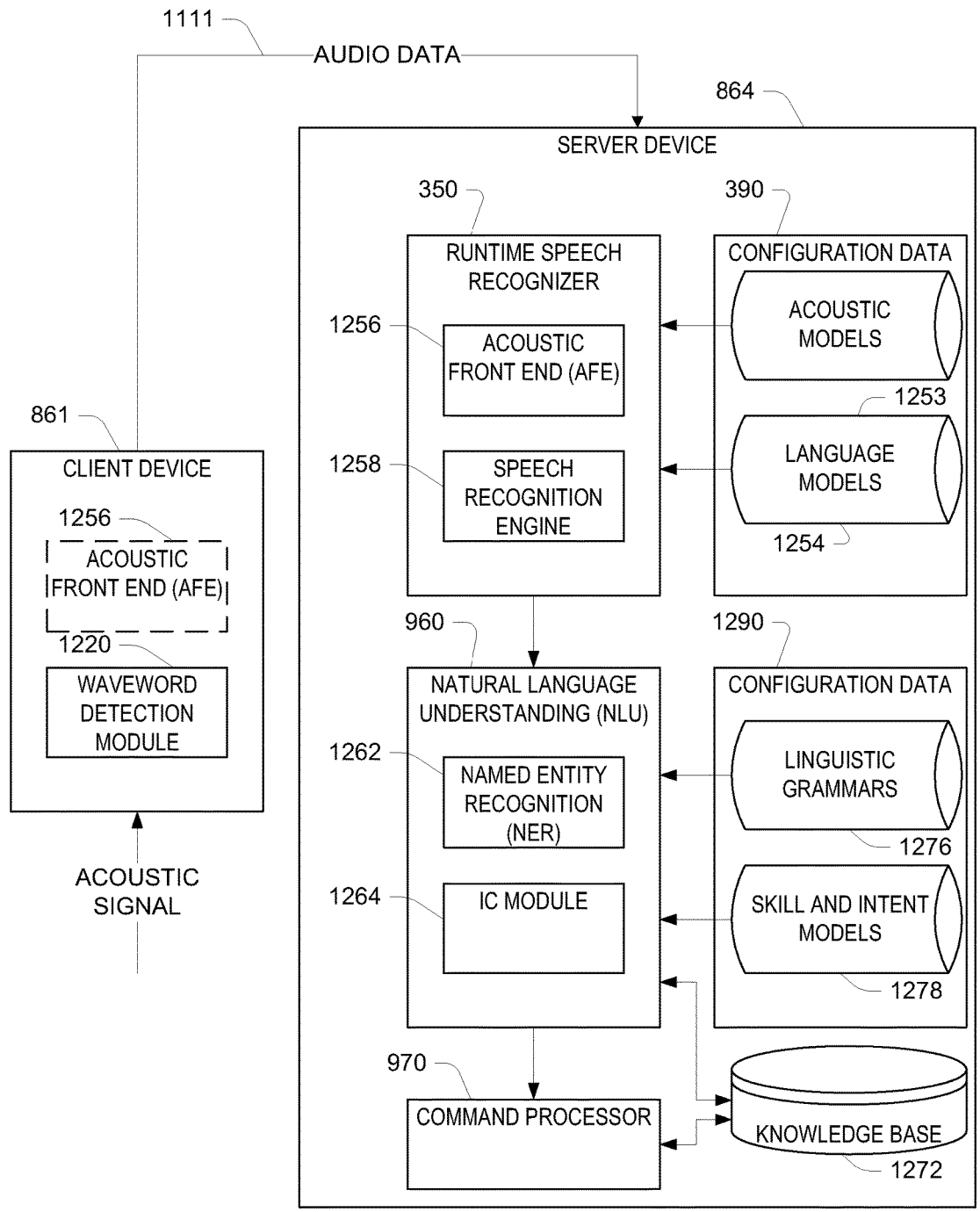
FIG. 8 is a diagram illustrating processing of a spoken utterance.

FIG. 8 presents a conceptual diagram of an example of how a spoken utterance is processed, allowing a system to capture and execute commands spoken by a user, such as spoken commands that may follow a wakeword. The various components illustrated may be located on a same or different physical devices. Communication between various components illustrated in FIG. 7 may occur directly or across a network 805. An audio capture component, such as a microphone of a client device 861, captures audio corresponding to a spoken utterance. The client device 861, using a wakeword detection module 1220, then processes the audio, or audio data corresponding to the audio, to determine if a keyword (such as a wakeword) is detected in the audio. Following detection of a wakeword, the device sends audio data 1111 corresponding to the utterance, to a server device 864 that includes an runtime speech recognizer 350. The audio data 1111 may be output from an acoustic front end (AFE) 1256 located on the device 861 prior to transmission. Or the audio data 111 may be in a different form for processing by a remote AFE 1256, such as the AFE 1256 located with the runtime speech recognizer 350.

The wakeword detection module 1220 works in conjunction with other components of the device, for example a microphone (not pictured) to detect keywords in audio. For example, the client device 861 may convert audio into audio data, and process the audio data with the wakeword detection module 1220 to determine whether speech is detected, and if so, if the audio data comprising speech matches an audio signature and/or model corresponding to a particular keyword.

The device 861 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the client device 861 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the client device 861 (or separately from speech detection), the client device 861 may use the wakeword detection module 1220 to perform wakeword detection to determine when a user intends to speak a command to the device 861. This process may also be referred to as keyword detection, with the wakeword being a specific example of a keyword. Specifically, keyword detection is typically performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection module 1220 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the client device 861 may "wake" and begin transmitting audio data 1111 corresponding to input audio to the server device(s) 864 for speech processing. Audio data corresponding to that audio may be sent to a server device 864 for routing to a recipient device or may be sent to the server for speech processing for interpretation of the included speech (either for purposes of enabling voice-communications and/or for purposes of executing a command in the speech). The audio data 1111 may include data corresponding to the wakeword, or the portion of the audio data corresponding to the wakeword may be removed by the local device 861 prior to sending. Further, a local device 861 may "wake" upon detection of speech/spoken audio above a threshold, as described herein. Upon receipt by the server(s) 864, the runtime speech recognizer 350 may convert the audio data 1111 into text. The recgonizer transcribes audio data into text data representing the words of the speech contained in the audio data. The text data may then be used by other components for various purposes, such as executing system commands, inputting data, etc. A spoken utterance in the audio data is input to a processor configured to perform ASR which then interprets the utterance with reference to acoustic models 1253 and language models 1254. Generally, the acoustic models 1253 include data that characterizes input data corresponding to different speech sounds (e.g., phonemes or other subword units) and structure of words in terms of subword units, with the language models 1254 characterize the possibility or likelihood of different word sequences. In some examples, the acoustic models include weights used to configure one or more artificial neural networks (ANNs), such as a neural network that accepts as input a portion of the input data (e.g., as a vector of numerical values) and produces as output scores associated with different subword units. Other forms of acoustic models 1253 may also be used, for example, using parameterized probability distributions (e.g., Gaussian Mixture Models, GMMs).

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., acoustic models 1253, and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, the runtime speech recognizer 350 outputs the most likely text recognized in the audio data. The recognizer may also output multiple hypotheses in the form of a lattice or an N-best list with each hypothesis corresponding to a confidence score or other score (such as probability scores, etc.).

The device or devices performing speech recognition processing may include an acoustic front end (AFE) 1256 and a speech recognition engine 1258. The acoustic front end (AFE) 1256 transforms the audio data from the microphone into data for processing by the speech recognition engine. The speech recognition engine 1258 processes the speech recognition data using acoustic models 1253, language models 1254, and other data models and information for recognizing the speech conveyed in the audio data, for example, determining a best matching and/or highest scoring word sequence corresponding to the input data. The AFE may reduce noise in the audio data and divide the digitized audio data into frames representing time intervals for which the AFE determines a number of values, called features, representing the qualities of the audio data, along with a set of those values, called a feature vector, representing the features/qualities of the audio data within the frame. Many different features may be determined, as known in the art, and each feature represents some quality of the audio that may be useful for speech recognition processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 1258 may process the output from the AFE 1256 with reference to information stored in the configuration data 390. Alternatively, post front-end processed data (such as feature vectors) may be received by the device executing speech recognition processing from another source besides the internal AFE. For example, the device 861 may process audio data into feature vectors (for example using an on-device AFE 1256) and transmit that information to a server across a network 805 for speech recognition processing. Feature vectors may arrive at the server encoded, in which case they may be decoded prior to processing by the processor executing the speech recognition engine 1258.

The speech recognition engine 1258 attempts to match received feature vectors to language phonemes and words as known in the stored acoustic models 1253 and language models 1254. The speech recognition engine 1258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the speech recognition process will output speech results that make sense grammatically. The specific models used may be general models or may be models corresponding to a particular domain, such as music, banking, etc.

The speech recognition engine 1258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following processing by the runtime speech recognizer 350, the text-based results may be sent to other processing components, which may be local to the device performing speech recognition and/or distributed across the network(s) 805. For example, speech recognition results in the form of a single textual representation of the speech, an N-best list including multiple hypotheses and respective scores, lattice, etc. may be sent to a server, such as server 864, for natural language understanding (NLU) processing, such as conversion of the text into commands for execution, either by the device 861, by the server 864, or by another device (such as a server running a specific application like a search engine, etc.).

The device performing NLU processing 960 (e.g., server 864) may include various components, including potentially dedicated processor(s), memory, storage, etc. As shown in FIG. 8, an NLU component 960 may include a named entity recognition (NER) module 1262 which is used to identify portions of query text that correspond to a named entity that may be recognizable by the system. A downstream process called named entity resolution actually links a text portion to an actual specific entity known to the system. To perform named entity resolution, the system may utilize gazetteer information stored in NLU data 1970. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

Generally, the NLU process takes textual input (such as processed from speech recognizer 350 on the utterance input audio) and attempts to make a semantic interpretation of the text. That is, the NLU process determines the meaning behind the text based on the individual words and then implements that meaning. NLU processing 960 interprets a text string to derive an intent or a desired action from the user as well as the pertinent pieces of information in the text that allow a device (e.g., device 861) to complete that action. For example, if a spoken utterance is processed using recognizer 350 and outputs the text "call mom" the NLU process may determine that the user intended to activate a telephone in his/her device and to initiate a call with a contact matching the entity "mom" (which may involve a downstream command processor 970 linked with a telephone application).

The NLU may process several textual inputs related to the same utterance. For example, if the recognizer 350 outputs N text segments (as part of an N-best list), the NLU may process all N outputs to obtain NLU results.

As will be discussed further below, the NLU process may be configured to parsed and tagged to annotate text as part of NLU processing. For example, for the text "call mom," "call" may be tagged as a command (to execute a phone call) and "mom" may be tagged as a specific entity and target of the command (and the telephone number for the entity corresponding to "mom" stored in a contact list may be included in the annotated result). Further, the NLU process may be used to provide answer data in response to queries, for example using the knowledge base 1272.

To correctly perform NLU processing of speech input, an NLU process 960 may be configured to determine a "domain" (also referred to as the "skill") of the utterance so as to determine and narrow down which services offered by the endpoint device (e.g., server 864 or device 861) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) module 1262 receives a query in the form of ASR results and attempts to identify relevant grammars and lexical information that may be used to construe meaning. To do so, the NER module 1262 may begin by identifying potential domains that may relate to the received query. The NLU data 1290 includes a databases of devices identifying domains associated with specific devices. For example, the device 861 may be associated with domains for music, telephony, calendaring, contact lists, and device-specific communications, but not video. In addition, the entity library may include database entries about specific services on a specific device, either indexed by Device ID, User ID, or Household ID, or some other indicator.

In NLU processing module 960, a domain may represent a discrete set of activities having a common theme, such as "shopping", "music", "calendaring", etc. As such, each domain may be associated with a particular language model and/or grammar database in a linguistic grammar storage 1276, a particular set of intents/actions in a skill and intent models storage 1278, and a particular personalized lexicon. Each gazetteer may include domain-indexed lexical information associated with a particular user and/or device. For example, a Gazetteer A includes domain-index lexical information. A user's music-domain lexical information might include album titles, artist names, and song names, for example, whereas a user's contact-list lexical information might include the names of contacts. Since every user's music collection and contact list is presumably different, this personalized information improves entity resolution.

As noted above, in traditional NLU processing 960, a query may be processed applying the rules, models, and information applicable to each identified domain. For example, if a query potentially implicates both communications and music, the query may, substantially in parallel, be NLU processed using the grammar models and lexical information for communications, and will be processed using the grammar models and lexical information for music. The responses based on the query produced by each set of models is scored (discussed further below), with the overall highest ranked result from all applied domains is ordinarily selected to be the correct result.

An intent classification (IC) module 1264 processes the query to determine an intent or intents for each identified domain, where the intent corresponds to the action to be performed that is responsive to the query. Each domain is associated with an intents classifier that generally processes text output from the speech recognizer to identify or score possible intents expressed in the input data. In some examples, the intent classifier uses a database of words linked to intents, while in other examples, a neural network based classifier maps input words to output scores for various intents. For example, a music intent database may link words and phrases such as "quiet," "volume off," and "mute" to a "mute" intent.

In order to generate a particular interpreted response, the NER 1262 applies the grammar models and lexical information associated with the respective domain to actually recognize a mention one or more entities in the text of the query. In this manner the NER 1262 identifies "slots" (i.e., particular words in query text) that may be needed for later command processing. Depending on the complexity of the NER 1262, it may also label each slot with a type of varying levels of specificity (such as noun, place, city, artist name, song name, or the like). Each grammar model includes the names of entities (i.e., nouns) commonly found in speech about the particular domain (i.e., generic terms), whereas the lexical information from the gazetteer is personalized to the user(s) and/or the device. For instance, a grammar model associated with the shopping domain may include a database of words commonly used when people discuss shopping.

The intents identified by the IC module 1264 are linked to domain-specific grammar frameworks with "slots" or "fields" to be filled. Each slot/field corresponds to a portion of the query text that the system believes corresponds to an entity. For example, if "play music" is an identified intent, a grammar framework or frameworks may correspond to sentence structures such as "Play {Artist Name}," "Play {Album Name}," "Play {Song name}," "Play {Song name} by {Artist Name}," etc. However, to make resolution more flexible, these frameworks would ordinarily not be structured as sentences, but rather based on associating slots with grammatical tags.

For example, the NER module 1262 may parse the query to identify words as subject, object, verb, preposition, etc., based on grammar rules and/or models, prior to recognizing named entities. The identified verb may be used by the IC module 1264 to identify intent, which is then used by the NER module 1262 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER module 1262 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

For instance, a query of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC module 1264 will determine corresponds to the "play music" intent. At this stage, no determination has been made as to the meaning of "mother's little helper" and "the rolling stones," but based on grammar rules and models, it is determined that the text of these phrases relate to the grammatical object (i.e., entity) of the query.

The frameworks linked to the intent are then used to determine what database fields should be searched to determine the meaning of these phrases, such as searching a user's gazette for similarity with the framework slots. So a framework for "play music intent" might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the slot/field using gazetteer information, the NER module 1262 may search the database of generic words associated with the domain. So for instance, if the query was "play songs by the rolling stones," after failing to determine an album name or song name called "songs" by "the rolling stones," the NER component 1262 may search the domain vocabulary for the word "songs." In the alternative, generic words may be checked before the gazetteer information, or both may be tried, potentially producing two different results.

The results of NLU processing may be tagged to attribute meaning to the query. So, for instance, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The output from the NLU processing (which may include tagged text, commands, etc.) may then be sent to a command processor 970, which may be located on a same or separate server 864. The destination command processor 970 may be determined based on the NLU output. For example, if the NLU output includes a command to play music, the destination command processor 970 may be a music playing application, such as one located on device 861 or in a music playing appliance, configured to execute a music playing command. If the NLU output includes a search request, the destination command processor 970 may include a search engine processor, such as one located on a search server, configured to execute a search command.

In FIG. 8, a single NLU module 960 is shown. In some embodiments, referred to as a multi-domain architecture, multiple separate NLU modules 960 are present, with each domain being associated with a corresponding NLU module 960. In the multi-domain architecture, each domain (which may include a set of intents and entity slots that define a larger concept such as music, books etc. as well as components such as trained models, etc. used to perform various NLU operations such as NER, IC, or the like) is constructed separately and made available to an NLU component 960 during runtime operations where NLU operations are performed on text (such as text output from a speech recognizer 350). Each domain may have specially configured components to perform various steps of the NLU operations.

In some embodiments, some of the procedures described in this document may be implemented in special purpose circuitry, for example, in an application specific integrated circuit (ASIC) or in a field programmable gate array (FPGA). Such circuitry may perform some computationally intensive aspects, for example, the processing of the speech processor and recognizer or the intent classifiers. In some embodiments, multiple processor cores, graphical processor units, and other related circuitry are integrated into a single integrated circuit that implements some or all of the functions of the runtime configuration.

It is to be understood that the foregoing description is intended to illustrate and not to limit the scope of the invention, which is defined by the scope of the appended claims. Other embodiments are within the scope of the following claims.

What is claimed is:

1. A machine-implemented method for labeling a linguistic input according to a user intent of the linguistic input, the method comprising:
   configuring a machine-implemented first encoder with a first set of parameter values for encoding a linguistic input as an encoded input, the encoded input being a numerical vector having a fixed dimension;
   storing on a machine-readable medium a plurality of intent encodings, each intent encoding being an output of a second encoder configured with a second set of parameter values, each intent encoding being an encoding using the second encoder of corresponding intent attributes of an intent of a plurality of intents, each intent encoding being a numerical vector of the same dimension as the encoded input; and
   processing a first linguistic input, the first linguistic input having been determined from a speech input, the processing including
      computing, using the machine-implemented first encoder, a first encoded input as an output of the first encoder with the first linguistic input as input,
      determining, using a machine-implemented third encoder, a plurality of intent scores, each intent score being associated with a different intent of the plurality of intents, determining each intent score of the plurality of intent scores including applying the first encoded input and an intent encoding of the plurality of intent encodings corresponding to said intent to the machine-implemented third encoder producing an intent score associated with said intent, and
      associating the first linguistic input with a set of determined intents according to the plurality of intent scores, including associating the first linguistic input with an intent associated with a best score of the plurality of intent scores;
   causing the first speech input to be processed according to the set of determined intents;
   receiving intent attributes for a further intent not being an intent of the plurality of intents;
   computing a further intent encoding as the output of the second encoder with the received intent attributes as input;
   adding the further intent encoding to the plurality of intent encodings, and storing the further intent encoding with the plurality of intent encodings; and
   processing a second linguistic input, including determining an intent score associated with the further intent by applying the further intent encoding as an input to the third encoder;
   wherein the machine-implemented first encoder comprises a first artificial neural network (ANN) having an output layer producing the encoded input, and the second encoder comprises a second ANN having an output layer having an output producing the label encoding, and wherein the parameter values of the first encoder and second encoder comprise values of weights of the first ANN and the second ANN, respectively.

2. A machine-implemented method for labeling a linguistic input, the method comprising:
   configuring a machine-implemented first encoder with a first set of parameter values for encoding a linguistic input as an encoded input, the encoded input being a numerical vector having a dimension;
   storing on a machine-readable medium a plurality of label encodings, each label encoding being an output of a machine-implemented second encoder configured with a second set of parameter values, each label encoding being an encoding using the machine-implemented second encoder of corresponding label attributes of a label of a plurality of labels, each label encoding being a numerical vector of the same dimension as the encoded input; and
   processing a first linguistic input, the first linguistic input having been determined from a speech input, the processing including
      computing, using the machine-implemented first encoder, a first encoded input as an output of the first encoder with the first linguistic input as input,
      determining, using a machine-implemented third encoder, a plurality of label scores, each label score being associated with a different label of the plurality of labels, determining each label score of the plurality of label scores including applying the first encoded input and a label encoding of the plurality of label encodings corresponding to said label to the machine-implemented third encoder producing a label score associated with said label, and associating the first linguistic input with one or more determined labels according to the plurality of label scores, including associating the first linguistic input with a label associated with a best score of the plurality of label scores; and causing the first speech input to be processed according to the determined one or more labels;

wherein the machine-implemented first encoder comprises a first artificial neural network (ANN) having an output layer producing the encoded input, and the second encoder comprises a second ANN having an output layer having an output producing the label encoding, and wherein the parameter values of the first encoder and second encoder comprise values of weights of the first ANN and the second ANN, respectively.

3. The method of claim 2 wherein the first linguistic input comprises a numerical vector, wherein at least some entries in the vector are associated with occurrences of corresponding words in the speech input.

4. The method of claim 2 further comprising:
receiving label attributes for a further label not being a label of the plurality of labels;
computing a further label encoding as the output of the second encoder with the received label attributes as input; and
adding the further label encoding to the plurality of label encodings, and storing the further label encoding with the plurality of label encodings.

5. The method of claim 4 further comprising:
processing a second linguistic input, the second linguistic input having been determined from a second speech input, the processing including
computing, using the first encoder, a second encoded input as an output of the first encoder with the second linguistic input as input,
determining, using the third encoder, a plurality of label scores, each label score being associated with a different label of the plurality of labels, the labels including the further label, the determining of each label score of the plurality of label scores including applying the first encoded input and a label encoding of the plurality of label encodings corresponding to said label to a third encoder producing a label score associated with said label, and
associating the second linguistic input with one or more determined labels according to the plurality of label scores, including associating the second linguistic input with a label associated with a best score of the plurality of label scores.

6. The method of claim 5 further comprising:
collecting linguistic inputs associated with the further label;
updating parameter values, including updating the first set of parameter values for the first encoder and the second set of parameter values for the second encoder, using the collected linguistic inputs;
configuring the first encoder with the updated first set of parameter values;
configuring the second encoder with the updated second set of parameter values;
computing updated label encodings, each updated label encoding being produced with the second encoder configured with the updated second set of parameter values with attributes for a label as input producing an updated label encoding as output; and
storing the plurality of updated label encodings for use in subsequent determining of label scores.

7. The method of claim 6 wherein updating the parameter values includes optimizing the parameter values according to a margin function based on a difference between a top scoring and a correct label for each of the collected linguistic inputs.

8. The method of claim 7 wherein optimizing the parameter values includes applying a gradient-based update procedure for the values.

9. The method of claim 6 further comprising:
processing a third linguistic input, the third linguistic input having been determined from a third speech input, the processing including
computing a third encoded input as an output of the first encoder with the third linguistic input as input,
determining a plurality of label scores, each label score being associated with a different label of the plurality of labels and the further label, the determining of each label score of the plurality of label scores including applying the first encoded input and a label encoding of the plurality of updated label encodings corresponding to said label to a third encoder producing a label score associated with said label, and
labeling the third linguistic input with a determined label according to the plurality of label scores.

10. The method of claim 2 wherein the third encoder comprises a third ANN configured to accept an encoded input and a label encoding as inputs, and to provide a label score as output.

11. The method of claim 2 wherein the third encoder comprises a scorer that outputs a value of a similarity function between inputs including an encoded input and a label encoding.

12. The method of claim 11 wherein the similarity function comprises a cosine function of an angle between the vector representations of the encoded input and the label encoding.

13. The method of claim 2 wherein the labels correspond to categories of semantic interpretation.

14. The method of claim 13 the categories correspond to intents or skills.

15. The method of claim 13 wherein causing the first speech input to be processed according to the determined one or more labels comprises, for each label of the one or more labels, determining a skill associated with the label, selecting a skill-specific intent scorer based on the determined skill, and using the skill-specific intent scorer to determine a score for an intent associated with the label.

16. A machine-implemented natural language (NL) understanding system comprising:
a machine-implemented speech input processor configured to accept data representing a spoken user input, and providing a linguistic input comprising a numerical vector having a fixed dimension;
a machine-implemented label recognizer configured to accept the linguistic input, and to provide a labeling the first linguistic input with one or more determined labels;
a machine-implemented command recognizer configured to the accept the labeling from the label recognizer and to cause the spoken user input to the processed according to the accepted labeling;
wherein the machine-implemented label recognizer comprises a label encoding library for storing a plurality of label encodings on a machine-readable medium;

a label encoder configured to accept label attributes for a new label not represented in the label encoding library and compute a label encoding for the new label for storing in the label encoding library;

a label encoding scorer configured to accept the linguistic input, and successive label encodings from the label encoding library producing successive label scores, and a label selector configured to accept the label scores and to determine the one or more determined labels according to the accepted label scores;

wherein the label encoding scorer comprises a sentence encoder configured to accept the linguistic input and produce a corresponding encoded input, and a similarity scorer configured to accept the encoded input and a label encoding from the label encoding library, and to produce a score for the linguistic input associated with a label represented by the label encoding; and wherein the label encoder comprises a first artificial neural network (ANN) having an output layer producing the label encoding, and sentence encoder comprises a second artificial neural network (ANN) having an output layer producing the sentence encoding, the first encoder and the second encoder being configured according to parameters comprises weights of the ANNs.

17. The system of claim 16 wherein the label selector is configured to select labels corresponding to one or more best of the label scores.

* * * * *